Sept. 9, 1969  A. F. STAMM  3,465,545
FRICTION WELDED DRIVE AXLE SHAFT HAVING
AN ANNULAR SECTION OF FLASH METAL
Filed Oct. 17, 1966  2 Sheets-Sheet 1

INVENTOR
Alex F. Stamm
BY
Strauch, Nolan, Neale, Nies & Bronaugh
ATTORNEYS

Sept. 9, 1969       A. F. STAMM       3,465,545
FRICTION WELDED DRIVE AXLE SHAFT HAVING
AN ANNULAR SECTION OF FLASH METAL
Filed Oct. 17, 1966       2 Sheets-Sheet 2

INVENTOR
Alex F. Stamm
BY
Strauch, Nolan, Neale, Nies & Bronaugh
ATTORNEYS

United States Patent Office 3,465,545
Patented Sept. 9, 1969

3,465,545
FRICTION WELDED DRIVE AXLE SHAFT HAVING AN ANNULAR SECTION OF FLASH METAL
Alex F. Stamm, Rochester, Mich., assignor to Rockwell-Standard Company, Pittsburgh, Pa., a corporation of Delaware
Filed Oct. 17, 1966, Ser. No. 587,070
Int. Cl. F16c 3/02; B23k 27/00
U.S. Cl. 64—1                                   3 Claims

ABSTRACT OF THE DISCLOSURE

A friction welded drive axle shaft wherein the parent metal is entirely surrounded by an annular section of flash metal.

---

The present invention refers to power transmitting drive shafts and more particularly to integral drive axle shafts for automotive vehicles.

In known automotive drive mechanism, driving torque from the power unit is eventually transmitted by drive axle shafts to road engaging wheels of the vehicle. These axle shafts usually extend from opposite sides of a differential drive unit, and they are usually provided at their outer wheel ends with integral or otherwise rigid drive flanges which are secured to the wheels for transmission of driving power. In service, these drive axle shafts, which have a relatively long unsupported length, are subjected to considerable torsional stress and sudden shock loads that are especially severe at the axle flange. It has been necessary to design these shafts with a certain amount of permissible torsional wind-up by which they are allowed to twist slightly and resiliently absorb sudden torsional stress changes during normal operation.

The relatively rigid wheel attaching drive flanges of these shafts are provided either with holes for bolted attachment to the wheel or with radial teeth for splined connection to an internally toothed companion member drive connected to the wheel. It is common practice to form integral flanged outer end drive axle shafts from a single bar of suitable steel stock by hot forging an end of the bar to controllably displace metal outward and provide the integral flange which is later pierced with bolt holes or cut with peripheral teeth. Expensive machinery and a complex series of operations are required to forge the axle shaft in one piece, and it is further difficult and expensive to accurately machine the bolt holes or teeth on the flange. Considerable waste may be involved because errors in forging or in machining the peripheral teeth or bolt holes will result in an unusable expensively forged shaft.

It has been proposed to produce the flange portion independently of the shaft portion, and mechanically secure the flange to the shaft after completing the machining operations on both parts. This, however, has created further problems because of the necessity of accurate correlation of the machined parts of both in the assembled unit, and the need for a suitable connection that will withstand the torque and shock loads. It had been proposed prior to the invention to attach the flange portion to the shaft portion by splines on the shaft end forced into mating serrations in a flange bore, but this was not satisfactory because the teeth of the splines tend to wear quickly under high and randomly applied torque loads, causing misalignment and vibration at this connection and subsequent early failure, especially in heavy duty service.

It has also been proposed to weld the machined end flange to the shaft by conventional ring welding. Although such provides a relatively strong joint in which even a certain torsional elasticity may be preserved, this process has proved costly and time consuming. A major disadvantage of ring welding the flange to the shaft lies in the requirements for further handling as the axle shaft unit is heat treated for optimum operation as a drive shaft. When these shaft units are quenched, the rim of the flange must be rolled in oil to cool it slowly to avoid cracking of the flange. During this procedure, the shaft portion is placed between rolls and rotated as it is immersed in the quenching media to prevent the shaft from bending. Such operations are necessarily costly and time consuming.

The present invention has for its major object to provide a novel method of producing an integral drive axle shaft unit wherein the foregoing disadvantages are eliminated and the resultant axle shaft unit is of improved quality.

It is another object of the invention to provide a drive axle shaft unit for motor vehicles wherein the wheel attaching flange is integrally combined with the axle shaft by a novel welding method.

A further object of the invention resides in the provision of a novel drive axle shaft unit wherein the wheel attachment flange is secured by friction welding.

Still another object of the invention is to provide a novel process wherein the shaft and end flange portions of a drive axle unit are friction welded together in such a way as to obtain an integral homogeneous structure capable of withstanding high torque and shock loads, and wherein the weld joint is at least as strong as any other cross section of the parent metal of the joined portions.

A further object of the invention is to provide a novel method of making a drive axle shaft unit wherein machined shaft and end flange portions are friction welded together at a joint wherein the flash produced during the welding operation is ground to provide smooth integral merging of the shaft into the flange, and the novel shaft unit thereby produced.

It is another object of the invention to provide a novel method of friction welding metal members together, especially suitable for the welding of steel drive axle shafts to steel outer end flanges, wherein one member such as the flange is formed with a central recess having a bottom flat axial surface perpendicular to the flange axis and an inclined diverging annular side wall providing a chamfer surface and the other member such as the shaft is formed with a corresponding converging chamfered surface end region surrounding a flat end axial surface perpendicular to the shaft axis, with said parts being of such original dimensions that when the members are brought into initial engagement for friction welding the chamfered surfaces seat smoothly with each other but the flat axial surfaces are initially separated a small amount and do not engage in friction welding relation until after the metal at the chamfered surfaces has become plastic to permit movement of the members toward each other until such separation no longer exists.

The friction welding of metal parts is generally known. The advantages of friction welding are that no external source of heat is required, the heating of the parts being joined is effectively localized in areas at the weld interface, and less power is required than for electrical arc or like welding. Friction welding usually consists of relatively rotating the metal parts to be welded together in surface engagement at the weld interface and simultaneously exerting axial pressure bringing the parts toward each other. Heat created by friction between the relatively moving part surfaces causes plastic deformation of the metal of both at the interface and the parts are united to form an integral unit.

It was believed prior to the invention that, although rods, flanges and other elements in general may have been successfully united by friction welding, a friction weld joint would not be strong enough to withstand the peculiar bending and/or torsion stresses encountered in drive axle shaft operation.

A superior friction welded joint is obtained in the invention by controlled regulation of temperature at the friction interface surfaces by control of speed of rotation and amount of axial pressure, and in some embodiments the forming of novel weld interfaces. These factors must be varied in relation to each other depending on the type of metal and size of cross section area to be welded. Prolonged bending and torsion tests on units welded in accord with the invention have proved that the weld joint is generally at least as strong as the parent metal itself, and test specimens which failed under rigorous drive axle testing conditions in most cases failed in sections remote from the weld joint.

In prior methods of friction welding rods to plates, flat surfaces on the plate and rod were engaged and the parts relatively rotated until enough frictional heat was created at the weld interfaces to produce a homogeneous weld. In some proposals the plate was formed with a recess to receive the end of the rod, some of these recesses being chamfered, but when subject to rigorous testing involving torsion loads all of these units failed at an early stage because of the formation of undesirable inclusions and decarburization at the weld interfaces.

The invention will be disclosed as applied to friction welds of two types, one where the flange and shaft end are formed with flat axial surfaces for abutment directly, and the other where the flange and shaft have special chamfered and related axial surfaces. In the preferred embodiment, the flange is provided with a chamfered recess to accept a mating chamfered surface on the shaft. The recess in the flange and the chamfered end of the shaft are of such relative dimensions that, when the chamfered surfaces on both members engage, a small space exists between the flat axial surfaces of the flange and the shaft end surrounded by the chamfers. This space can be very small and need to be not more than 0.030" to 0.040" wide for example. Thus, at the start of the welding cycle in this embodiment, rotating friction will initially produce welding heat only at the engaged chamfered surfaces of both members prior to the frictional contact of the flat axial surfaces, which latter occurs only when the engaged chamfered surfaces become plastic and are deformed under applied axial pressure. In both embodiments of the invention the flash surrounding the welded joint is removed in a novel manner to insure against stress localization and provide a joint of optimum structure. By the novel method of the invention a high quality homogeneous weld is produced which tests show to be superior to other prior friction welding methods.

Further objects of the invention will appear as the description proceeds in connection with the appended claims and the annexed drawings wherein:

Figure 1:
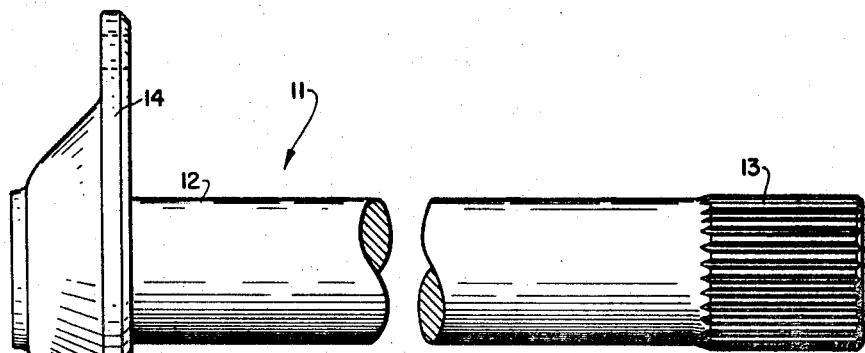
FIGURE 1 is a side elevation of a drive axle shaft unit made according to the invention, partially broken away and sectioned.

FIGURE 1 shows an integral drive axle shaft unit 11 consisting essentially of a cylindrical steel shaft 12 formed at its inner end with a splined section 13 for attachment to a usual differential side gear and at its outer end with a radial wheel attachment flange 14 provided with a row of bolt holes 15 whose centers lie on a circle concentric with the shaft axis.

Figure 2:
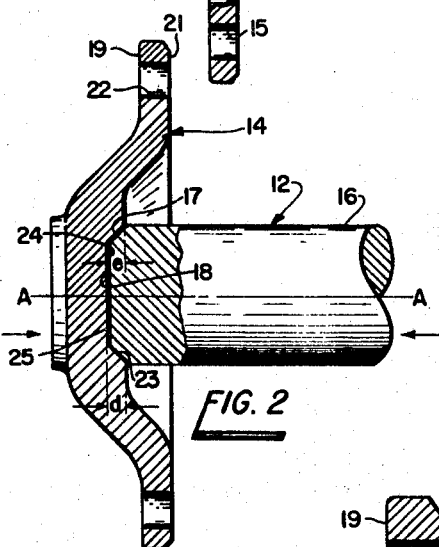
FIGURE 2 is a fragmentary view illustrating a preferred embodiment of the invention wherein the shaft end is friction welded to the flange.

FIGURE 2 illustrates a preferred embodiment of a method for making the shaft unit of FIGURE 1. The shaft 12 and the flange 14 are separately made. Shaft 12 is cut from a suitable length of bar stock of steel usually used for axle shafts and is machined to provide a central smooth surfaced cylindrical section 16 formed at the inner end with the splined section 13 and at the outer end with a chamfered conical surface 17 coaxial with section 16 and a flat smooth axial end surface 18 lying in a plane normal to the shaft axis. Flange 14 is forged from steel to approximate final shape, and then machined on its periphery to provide parallel flat flange surfaces 19 and 21 pierced by bolt holes 22 and at its inner side to form a recess having a smooth conical side wall surface 23 and a flat smooth bottom surface 24 that faces axially. Surfaces 19, 21 and 24 lie in parallel planes perpendicular to the flange axis, and surfaces 23 and 24 and the circle containing the centers of the bolt holes are concentric with the flange axis.

During the friction welding operation the flange 14 and shaft 12 are mounted in suitable chucks or jigs wherein they are relatively rotated at high speed about the axis A—A while at the same time axial pressure is applied to urge them toward each other. During initial engagement the chamfered shaft end enters the flange recess until conical surfaces 17 and 23 which are disposed at the same angle, which may be 45°, to axis A—A are in full surface engagement.

The axial engaged length $e$ of the chamfered end of the shaft is however carefully dimensioned to be slightly less than the axial depth $d$ of the flange recess, so that when surfaces 17 and 23 are initially engaged in relative rotation the end surface 18 of the shaft and the bottom surface 24 of the flange recess are spaced apart a small amount as indicated at 25, for example about 0.040".

Therefore during initial engagement of the shaft and flange, frictional heat is generated only at the peripheral surfaces 17 and 23. When the heat becomes sufficient the metal at these engaged surfaces becomes plastic and deformable and, under the influence of maintained axial pressure, the shaft and flange move slightly toward each other to bring axial surfaces 18 and 24 into relatively rotating frictional contact. Soon the metal at all of the engaged frictionally heated surfaces becomes plastic and deformable and then the relative rotation of the flange and shaft is arrested while the axial pressure is maintained as the blended weld region cools and hardens.

Figure 4:
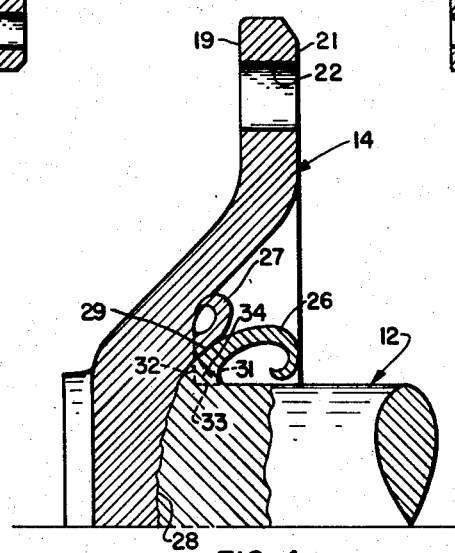
FIGURE 4 is an elevation partly in section showing the welded drive axle shaft unit at the flange end and illustrating the flash produced during friction welding in both embodiments.

FIGURE 4 illustrates the friction welded joint as it appears after coalescence and hardening of the joint to integrally connect the shaft and the flange. During the welding engagement an annulus 26 of flash metal from the shaft is formed around the periphery of the shaft and a related annulus 27 of flash metal from the flange is formed around the periphery of the recess. This flash represents metal that has been plastically deformed out of the weld region due to the axial pressure maintained on the parts, and which has cooled as projections from the weld region.

As shown in FIGURE 4 the weld interface which is the average region of metal coalescence may be indicated at line 28 and it will be seen that this extends externally into the flash so that the inner portions of the flash are welded together around the base of the juncture of the shaft and flange as indicated at 29, and the bond decreases rapidly outwardly until the flash actually separates as shown.

Figure 5:
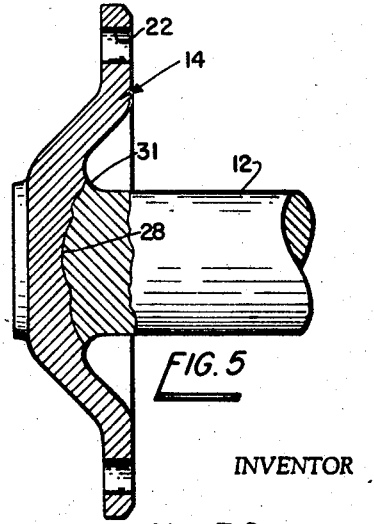
FIGURE 5 is an elevation partly in section like FIGURE 4 but showing the completed unit with the flash ground away in accord with the invention.

An important phase of the invention is that part of the process wherein the flash is partially ground off all around the cooled weld joint on the radius indicated at 31 which lies within the flash radially outside the parent metal of both the shaft and flange. Thus in the invention the root area of the shaft is increased where it is joined to the flange, and the thickened junction has a smooth outer radius aiding in stress concentration elimination. Lines 32 and 33 indicate the effective limits of parent metal of the flange and shaft respectively, and so the annular area 34 which is of at least equal strength to the parent metal is added to the juncture by the friction welding and grinding operation. FIGURE 5 shows the drive axle shaft unit as it appears after the flash grinding operation.

Figure 3:
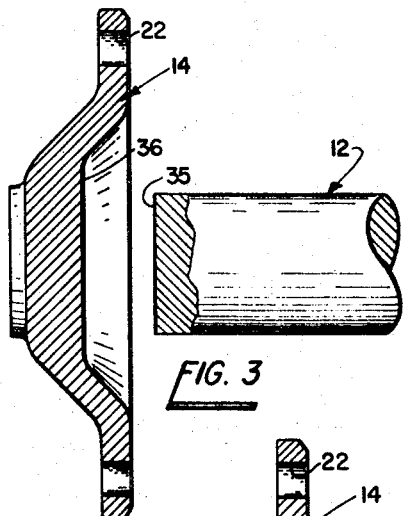
FIGURE 3 is a similar fragmentary view partly in section showing another embodiment of the invention wherein the shaft end is friction welded to the flange.

FIGURE 3 illustrates the other embodiment of the invention wherein the finish machined shaft 12 is formed with a smooth axial planar end surface 35 normal to the shaft axis and finish machined flange 14 is formed with a coaxial central smooth planar surface 36. The flange and shaft rotating relatively about their common axis are bought into frictional engagement under axial pressure at surfaces 35, 36 and this is maintained until the parts are friction welded. This is a single stage operation as distinguished from the two stage operation of FIGURE 2, but the final solid weld joint becomes very much the same in physical structure as shown in FIGURE 4 and it is ground off to the final form of FIGURE 5.

In both embodiments the added annular area at the outer rim of the weld joint contributes to resistance to torsional load and shock. The weld interface in both showed some decarburization and oxide inclusion, but this was not significant in the area 34. The FIGURE 2 embodiment is preferred because it has been observed to add a larger useful cross sectional area at rim 34 of the weld joint, which in turn permits a more generous fillet curve for the radius 31, and it has been observed that the outer portion of the weld region has fewer oxide inclusions.

Following the grinding operation in both embodiments, the shaft unit is subjected to conventional axle shaft production heat treatment and subsequent shot peening for surface hardening.

Figure 6:
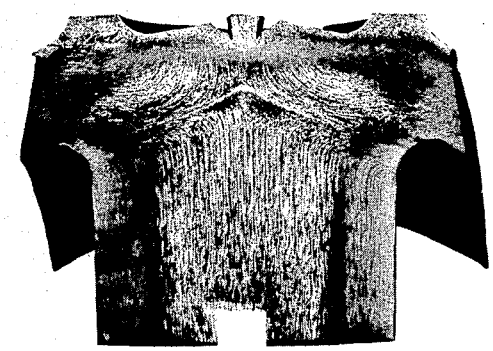
FIGURES 6 and 7 are photographic views of macroetched friction welded junctures showing the improved grain flow structure in the complete drive axle unit.
Figure 7:
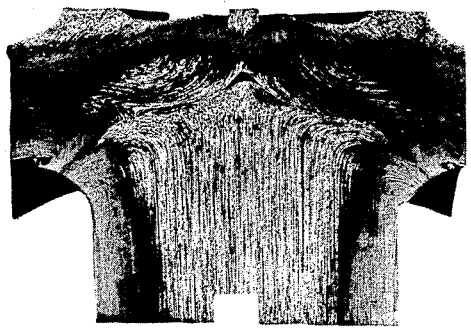

FIGURES 6 and 7 are reproductions of macro-etched sections of actual finished drive axle shafts made according to the invention and after they had successfully undergone rigorous operational tests including 500,000 torque reversal cycles, without failure. FIGURE 6 shows a shaft made according to the FIGURE 2 embodiment. It will be observed that in each the metal grain lines flow outwardly into the added flash region 34 where they are substantially parallel to each other in the outer heat treated and hardened rim section that smoothly merges with the adjacent hardened surface regions of the shaft and flange. As an example of the type of apparatus that may be used to carry out the foregoing friction welding operations, reference is made to copending Ser. No. 332,365 filed Dec. 23, 1963.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An integral steel flanged-end drive axle shaft unit consisting of a shaft portion having one end permanently united to an end flange portion at a friction weld joint wherein central friction welded parent metal is entirely surrounded by an annular section of flash metal of larger diameter than the shaft portion and formed of blended metal displaced from both portions during friction welding, said unit being formed around said joint at said section with an annular smooth arcuate fillet merging into adjacent surfaces of the shaft and flange portions.

2. The unit defined in claim 1 wherein said end flange portion has a series of circumferentially spaced drive coupling portions concentric with said shaft portion.

3. The unit defined in claim 1 wherein the metal grain lines in each of said shaft and end flange portions flow outwardly into substantial parallelism at said annular section.

References Cited

UNITED STATES PATENTS

| 2,667,047 | 1/1954 | Mennear | 301—126 X |
| 3,234,645 | 2/1966 | Hollander et al. | 29—470.3 |
| 3,273,233 | 9/1966 | Oberle et al. | 29—470.3 |

JOHN F. CAMPBELL, Primary Examiner

B. L. ADAMS, Assistant Examiner

U.S. Cl. X.R.

29—470.3, 481; 301—126